(12) United States Patent
Otomo et al.

(10) Patent No.: US 11,560,802 B2
(45) Date of Patent: Jan. 24, 2023

(54) BLADE AND GAS TURBINE

(71) Applicant: Mitsubishi Power, Ltd., Kanagawa (JP)

(72) Inventors: Hiroyuki Otomo, Kanagawa (JP); Shogo Furukawa, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/261,441

(22) PCT Filed: Jun. 5, 2019

(86) PCT No.: PCT/JP2019/022279
§ 371 (c)(1),
(2) Date: Jan. 19, 2021

(87) PCT Pub. No.: WO2020/039690
PCT Pub. Date: Feb. 27, 2020

(65) Prior Publication Data
US 2021/0310360 A1    Oct. 7, 2021

(30) Foreign Application Priority Data

Aug. 24, 2018  (JP) .............................. JP2018-157597

(51) Int. Cl.
*F01D 5/18* (2006.01)
*F01D 9/02* (2006.01)
*F01D 25/12* (2006.01)

(52) U.S. Cl.
CPC .............. *F01D 5/186* (2013.01); *F01D 5/18* (2013.01); *F01D 5/187* (2013.01); *F01D 9/02* (2013.01);

(Continued)

(58) Field of Classification Search
CPC . F01D 5/186; F01D 5/187; F01D 9/02; F01D 9/04; F01D 9/041; F01D 9/042;
(Continued)

(56) References Cited

U.S. PATENT DOCUMENTS 7,168,914 B2    1/2007  Shiozaki et al.
2003/0012647 A1*  1/2003  Shiozaki ................. F01D 5/189
                                                    415/191

(Continued)

FOREIGN PATENT DOCUMENTS

JP          4508482          7/2010

OTHER PUBLICATIONS

International Search Report dated Jul. 9, 2019 in International (PCT) Application No. PCT/JP2019/022279.

*Primary Examiner* — Woody A Lee, Jr.
*Assistant Examiner* — Elton K Wong
(74) *Attorney, Agent, or Firm* — Wenderoth, Lind & Ponack, L.L.P.

(57) ABSTRACT

A blade and gas turbine include a stationary blade main body provided internally with cavities, and an inner shroud linked to an end portion, in the longitudinal direction, of the stationary blade main body, and which is internally provided with an inner shroud cooling passage with which a first cavity is in fluid communication. The inner shroud is provided, in front edge corner portions, with a first chamfered portion intersecting a front surface, a side surface, and an upper surface, and first cooling holes in fluid communication with the inner shroud cooling passage are provided in the first chamfered portion.

8 Claims, 9 Drawing Sheets

(52) U.S. Cl.
CPC .......... *F01D 25/12* (2013.01); *F05D 2220/32* (2013.01); *F05D 2240/12* (2013.01); *F05D 2240/30* (2013.01); *F05D 2260/202* (2013.01)

(58) Field of Classification Search
CPC .. F01D 25/12; F05D 2220/32; F05D 2240/12; F05D 2240/30; F05D 2260/202
See application file for complete search history.

(56) References Cited

U.S. PATENT DOCUMENTS

| | | | |
|---|---|---|---|
| 2004/0076511 A1* | 4/2004 | Tomita | F01D 25/12 415/115 |
| 2016/0177751 A1* | 6/2016 | Otomo | F01D 5/18 60/805 |
| 2018/0045060 A1* | 2/2018 | Matsuo | F01D 25/12 |

* cited by examiner

BLADE AND GAS TURBINE

TECHNICAL FIELD

The present invention relates to a blade such as a stationary blade or a rotor blade to be applied to a gas turbine, and a gas turbine including the blade.

BACKGROUND ART

General gas turbines are constituted by a compressor, a combustor, and a turbine. The compressor compresses the air taken in from an air inlet to obtain high-temperature and high-pressure compressed air. The combustor obtains high-temperature and high-pressure combustion gas by supplying fuel to the compressed air to combust the supplied fuel. The turbine is driven by this combustion gas and drives a generator coaxially linked thereto.

In gas turbines, the turbine is configured such that a plurality of stationary blades and rotor blades are arranged in a compartment along a flow direction of the combustion gas, each stationary blade is supported by a shroud mounted inside the compartment, and the rotor blades are supported by a rotor. For that reason, when the combustion gas generated by the combustor flows through a gas flow path, the rotor is rotationally driven as the combustion gas passes through a plurality of stationary blades and rotor blades. This gas flow path is formed as a space surrounded by an outer shroud, an inner shroud, a platform of each rotor blade, and a ring segment.

In the above-described turbines, the stationary blade has a cooling passage provided therein. Cooling air is supplied into the outer shroud to cool an inner surface thereof, and then flows into the stationary blade to flow into the internal cooling passage to impingement-cool the stationary blade, and a portion of the cooling air is jetted from the cooling hole to the outside to convection-cool the stationary blade. Additionally, the cooling air, which has cooled the stationary blade, flows into the inner shroud to cool the inner surface and is then discharged to the outside.

In the related art, for example, Japanese Patent No. 4508482 discloses such a gas turbine.

SUMMARY OF INVENTION

Technical Problem

In the stationary blades of the gas turbine, corner portions of a leading edge of the outer shroud or the inner shroud are likely to be burned out due to the combustion gas. For that reason, in Japanese Patent No. 4508482, a cooling flow path from a cooling air discharge port of a stationary blade portion extends rearward along a side edge from a leading edge side corner portion of the inner shroud, and a film cooling hole is provided to cause the cooling air to flow out from the cooling flow path to an acute-angled corner portion. However, in Japanese Patent No. 4508482, a large number of film cooling holes is provided on the outer surface and side edges of the inner shroud. For that reason, although the outer surface and side edges of the inner shroud can be cooled by the cooling air flowing out from the film cooling holes, the cooling of the acute-angled corner portion itself of the inner shroud becomes insufficient, and it is desired that the cooling performance of the inner shroud is further improved.

The present invention solves the above-described problems, and an object of the present invention is to provide a blade and a gas turbine for improving cooling performance by efficiently cooling a blade supporting member.

Solution to Problem

The blade of the present invention for achieving the above object includes a blade body having a cooling passage provided therein; and a blade supporting member linked to an end portion of the blade body in a longitudinal direction and having a space portion provided therein which is in fluid communication with the cooling passage. The blade supporting member has two leading edge corner portions on a leading edge side and two trailing edge corner portions on a trailing edge side, at least any one of the leading edge corner portions is provided with a first chamfered portion intersecting three or more outer surfaces, and the first chamfered portion is provided with a first cooling hole in fluid communication with the space portion.

Therefore, since the cooling air supplied to the space portion of the blade supporting member flows out from the first chamfered portion through the first cooling hole of the leading edge corner portion, the first chamfered portion intersecting the three outer surfaces of the leading edge corner portion in the blade supporting member is appropriately cooled by the cooling air. For that reason, the high temperature region of the blade supporting member can be efficiently cooled, and the cooling performance can be improved.

In the blade of the present invention, the first cooling hole is provided to be inclined toward a gas pass surface side of the blade supporting member to which the end portion of the blade body is linked.

Therefore, since the first cooling hole allows the cooling air in the space portion to be inclined and flows out toward the gas pass surface side of the blade supporting member to which the end portion of the blade body is linked, the gas pass surface side of the corner portion in the blade supporting member can be efficiently cooled.

In the blade of the present invention, a second cooling hole is provided to open at least two outer surfaces of the three outer surfaces to the outside from the space portion.

Therefore, the cooling air in the space portion flows out from the first chamfered portion through the first cooling hole and also flows out from the two outer surfaces through the second cooling hole. As a result, the corner portion in the blade supporting member can be efficiently cooled.

In the blade of the present invention, the first cooling hole and the second cooling hole are provided parallel to each other.

Therefore, since the first cooling hole and the second cooling hole are parallel to each other, the first cooling hole and the second cooling hole can be formed at the same time by one drilling using a plurality of drilling tools, and the machining cost can be reduced by improving the workability.

In the blade of the present invention, a second chamfered portion is provided to intersect two outer surfaces of the three outer surfaces, and a third cooling hole is provided to open the second chamfered portion to the outside from the space portion.

Therefore, the cooling air in the space portion flows out from the first chamfered portion through the first cooling hole and also flows out from the second chamfered portion through the third cooling hole. As a result, the corner portion in the blade supporting member can be efficiently cooled.

In the blade of the present invention, the second chamfered portion is provided to be separated from a gas pass surface side of the blade supporting member to which the end portion of the blade body is linked.

Therefore, since the cooling air in the space portion flows out from the second chamfered portion through the third cooling hole provided to be separated from the gas pass surface side of the blade supporting member to which the end portion of the blade body is linked, the cooling air does not adversely affect the gas passing through the blade body.

In the blade of the present invention, the space portion includes a leading edge side cooling passage, a side end portion side cooling passage of which one end portion communicates with the leading edge side cooling passage and the other end portion opens to the outside, and a linking cooling passage that links the cooling passage to the leading edge side cooling passage.

Therefore, the cooling air supplied to the cooling passage of the blade body flows from the linking cooling passage through the leading edge side cooling passage to the side end portion side cooling passage, flows to the outside, and flows out from the first chamfered portion through the first cooling hole. As a result, the blade supporting member can be efficiently cooled.

In the blade of the present invention, the blade supporting member has a rectangular shape, and the first cooling hole is provided in at least one of the two leading edge corner portions.

Therefore, since the first cooling hole is provided in at least one of the two leading edge corner portions, only the high temperature region of the blade supporting member can be efficiently cooled.

In the blade of the present invention, a plurality of the blade supporting members are annularly combined together to provide a blade combination, and the first cooling hole is provided at a leading edge corner portion of the blade combination.

Therefore, when the blade supporting member is the blade combination in which the plurality of the blade supporting members are annularly combined together, the first cooling hole is provided at the leading edge corner portion of the blade combination. Therefore, only the high temperature region of the blade combination is efficiently cooled.

Additionally, a gas turbine of the present invention includes a compressor that compresses air; a combustor that mixes the compressed air compressed by the compressor with fuel to combust the mixed fuel; and a turbine that has the blade and obtains rotational power from a combustion gas generated by the combustor.

Therefore, in the blade of the turbine, the cooling air supplied to the space portion of the blade supporting member flows out from the first chamfered portion through the first cooling hole, so that the first chamfered portion intersecting the three outer surfaces of the leading edge corner portion in the blade supporting member is appropriately cooled by the cooling air. For that reason, the high temperature region of the blade supporting member can be efficiently cooled, and the cooling performance can be improved.

Advantageous Effects of Invention

According to the blade and the gas turbine of the present invention, the high temperature region of the blade supporting member can be efficiently cooled, and the cooling performance can be improved.

DESCRIPTION OF EMBODIMENTS

Hereinafter, a preferred embodiment of a stationary blade and a gas turbine according to the present invention will be described in detail with reference to the drawings. In addition, the present invention is not limited to the embodiment, and in a case where there are a plurality of embodiments, the present invention also includes a combination of the respective embodiments.

Figure 9:
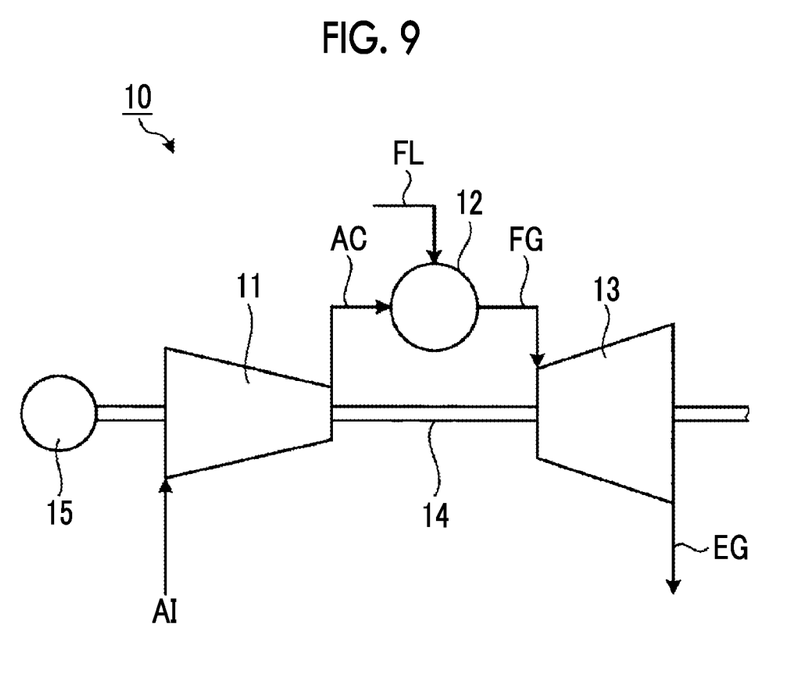
FIG. 9 is a schematic view illustrating the overall configuration of a gas turbine.
Figure 10:
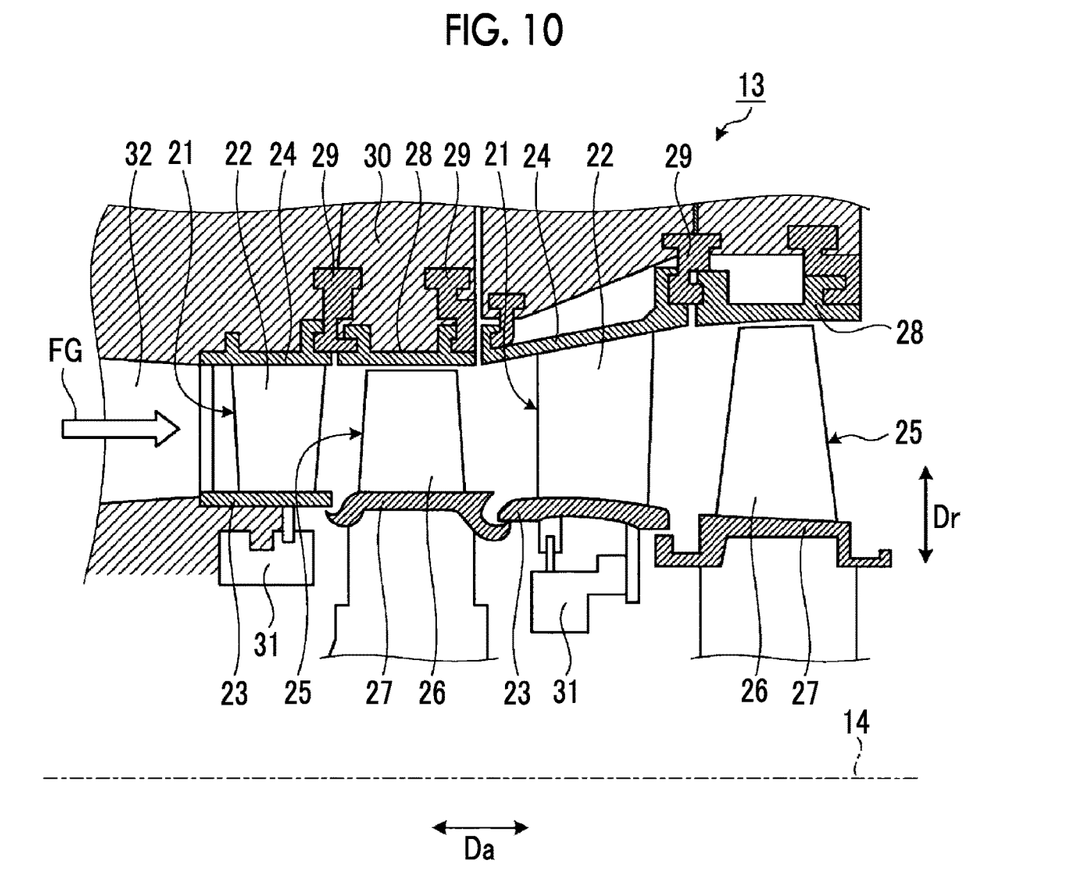
FIG. 10 is a cross-sectional view illustrating a gas flow path of a turbine.

FIG. 9 is a schematic view illustrating the overall configuration of the gas turbine, and FIG. 10 is a cross-sectional view illustrating a gas flow path of the turbine.

In the present embodiment, as illustrated in FIG. 9, the gas turbine 10 is configured such that a compressor 11, a combustor 12, and a turbine 13 are coaxially arranged by a rotor 14, and a generator 15 is linked to one end portion of the rotor 14. In addition, in the following description, a direction in which a central axis of the rotor 14 extends is defined as an axial direction Da, a circumferential direction centered on the central axis of the rotor 14 is defined as a circumferential direction Dc, and a direction perpendicular to the central axis of the rotor 14 is defined as a radial direction Dr.

The compressor 11 generates high-temperature and high-pressure compressed air AC by passing air AI taken in from an air inlet through a plurality of stationary blades and rotor blades to compress the air AI. The combustor 12 supplies a predetermined fuel FL to the compressed air AC and combusts the compressed air AC to generate a high-temperature and high-pressure combustion gas FG. The combustion gas FG is discharged as an exhaust gas EG after passing through the stationary blades and the rotor blades of the turbine 13. The turbine 13 rotationally drives the rotor 14 by passing the combustion gas FG through a plurality of stationary blades and rotor blades, and drives the generator 15 linked to the rotor 14.

Additionally, as illustrated in FIG. 10, the turbine 13 is configured such that one end portion of a stationary blade body (blade body) 22 of a stationary blade 21 is fixed to an inner shroud (blade supporting member) 23, and the other end portion of the stationary blade body 22 is fixed to an outer shroud 24. The rotor blade 25 is configured such that a base end portion of the rotor blade body 26 is fixed to a platform 27. Then, the outer shroud 24 and a ring segment 28 disposed on a tip portion side of the rotor blade 25 are supported by a compartment (turbine compartment) 30 via a heat shield ring 29, and the inner shroud 23 is supported by a support ring 31. For that reason, a combustion gas flow path 32 through which the combustion gas FG passes is formed in the axial direction Da as a space surrounded by the inner shroud 23, the outer shroud 24, the platform 27, and the ring segment 28.

Figure 1:
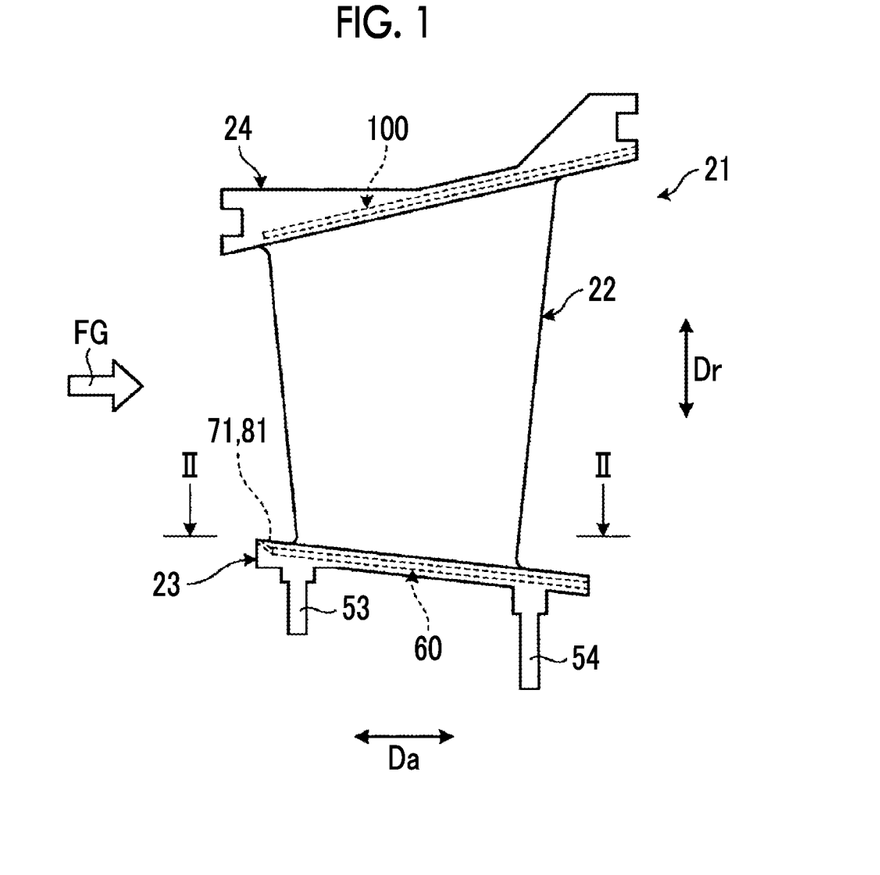
FIG. 1 is a front view illustrating a stationary blade of the present embodiment.

Here, the stationary blade body 22, the inner shroud 23, and the outer shroud 24 that constitute the stationary blade 21 will be described in detail. FIG. 1 is a front view illustrating a stationary blade of the present embodiment, and FIG. 2 is a cross-sectional view taken along line II-II of FIG. 1 illustrating an inner shroud.

Figure 2:
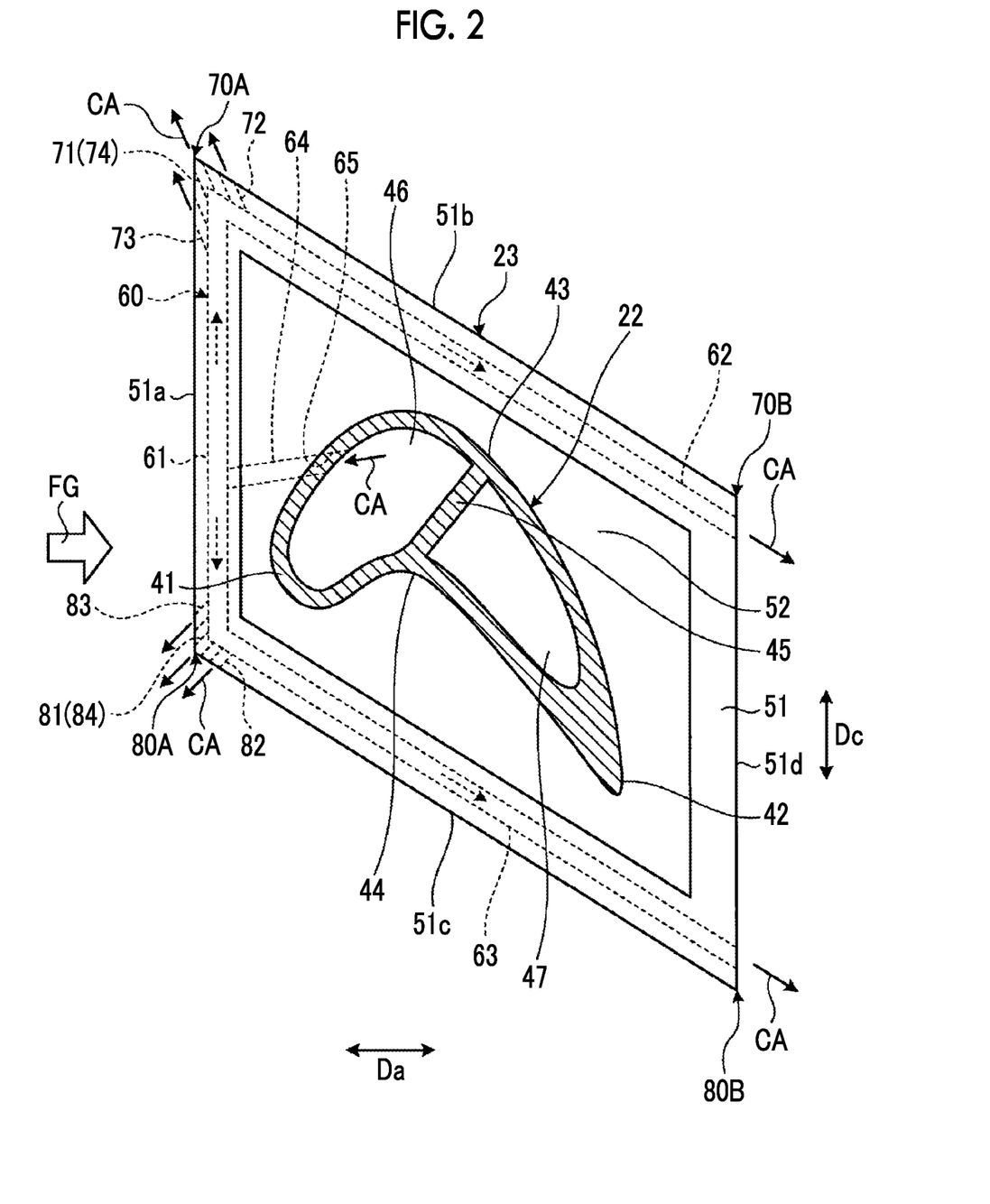
FIG. 2 is a cross-sectional view taken along line II-II of FIG. 1 illustrating an inner shroud.

As illustrated in FIGS. 1 and 2, the stationary blade 21 is, for example, a two-stage stationary blade, and one end portion of the stationary blade body 22 in the longitudinal direction (an inner end portion thereof in the radial direction Dr) is fixed to the inner shroud (blade supporting member) 23, and the other end portion thereof in the longitudinal direction (an outer end portion thereof in the radial direction Dr) is fixed to the outer shroud 24. Here, an upper surface of the inner shroud 23 in contact with the combustion gas FG is a gas pass surface, and a lower surface of the outer shroud 24 in contact with the combustion gas FG is a gas pass surface. Additionally, the stationary blade 21 is provided with a cooling passage (to be described below) for supplying cooling air CA from the outer shroud 24 to the inner shroud 23 through the inside of the stationary blade body 22.

The stationary blade body 22 has a hollow shape, a front end portion 41 on an upstream side (left side in FIG. 2) in a flow direction (axial direction Da) of the combustion gas FG has a curved cross-sectional shape, and a rear end portion 42 on a downstream side (right side in FIG. 2) in the flow direction (axial direction Da) of the combustion gas FG has a tapered cross-sectional shape. In the stationary blade body 22, a back portion 43 on one side (upper side in FIG. 2) in a direction (radial direction Dr) intersecting the flow direction of the combustion gas FG has a convexly curved cross-sectional shape, and an abdominal portion 44 on the other side (lower side in FIG. 2) in the direction (radial direction Dr) intersecting the flow direction of the combustion gas FG has a concavely curved cross-sectional shape.

Additionally, the inside of the stationary blade body 22 is divided into two cavities (cooling passages) 46 and 47 by a partition wall 45. A first cavity 46 is disposed on the front end portion 41 side of the stationary blade body 22, and a second cavity 47 is disposed on the rear end portion 42 side of the stationary blade body 22. In addition, although not illustrated, the stationary blade body 22 has a plurality of cooling holes penetrating the inside and the outside formed at predetermined positions corresponding to the cavities 46 and 47, respectively. Additionally, in the stationary blade body 22, a porous plate is disposed inside each of the cavities 46 and 47, and the stationary blade body 22 is subjected to impingement-cooling by the cooling air CA supplied to each of the cavities 46 and 47, and then, this cooling air CA is jetted from each cooling hole to the outside to convection-cool the stationary blade body 22.

The inner shroud 23 is configured to have a rectangular frame 51 formed by four flange portions 51a, 51b, 51c, and 51d, and an attachment portion 52 integrally formed inside the frame 51. One end portion of the stationary blade body 22 in the longitudinal direction is fixed to a front surface portion of the attachment portion 52. The inner shroud 23 is formed such that retainers 53 and 54 protrude from a back surface portion of the attachment portion 52. The retainer 53 is provided as an upstream attachment portion on the upstream side in the flow direction of the combustion gas FG, the retainer 54 is provided as a downstream attachment portion on the downstream side in the flow direction of the combustion gas FG, and the retainers 53 and 54 are fixed to the support ring 31 (refer to FIG. 10). In this case, in the inner shroud 23, the flange portions 51a and 51d are disposed parallel to each other in the circumferential direction Dc, the flange portions 51b and 51c are disposed parallel to each other in a direction inclined in the circumferential direction Dc with respect to the axial direction Da, and the flange portions 51a, 51b, 51c, and 51d have a rectangular shape approximated to a rhomboid shape as a whole.

The inner shroud 23 is provided with an inner shroud cooling passage 60 that supplies the cooling air CA, which has been supplied from the outer shroud 24 through the stationary blade body 22, to at least a portion therearound. The inner shroud cooling passage 60 has a leading edge side cooling passage 61, side end portion side cooling passages 62 and 63, and a linking cooling passage 64.

The leading edge side cooling passage 61 is provided along the flange portion 51a at a leading edge of the inner shroud 23 on the upstream side in the flow direction of the combustion gas FG from the stationary blade body 22 and on the back portion 43 side of the stationary blade body 22 in the width direction (circumferential direction Dc). The side end portion side cooling passage 62 is provided along the flange portion 51b of the inner shroud 23 on the back portion 43 side of the stationary blade body 22 in the width direction (circumferential direction Dc). The side end portion side cooling passage 63 is provided along the flange portion 51c of the inner shroud 23 on the abdominal portion 44 side of the stationary blade body 22 in the width direction (circumferential direction Dc). The linking cooling passage 64 is provided along the flange portions 51b and 51c at the leading edge of the inner shroud 23 on the upstream side in the flow direction of the combustion gas FG from the stationary blade body 22 and at a substantially intermediate position in the width direction (circumferential direction Dc).

One end portion of the linking cooling passage 64 communicates with the first cavity 46 through a communication hole 65 of the stationary blade body 22, and the other end portion thereof communicates with the leading edge side cooling passage 61. The leading edge side cooling passage 61 is provided in the flange portion 51a, one end portion thereof communicating with one end portion of the side end portion side cooling passage 62 and the other end portion thereof communicating with one end portion of the side end portion side cooling passage 63. The side end portion side cooling passage 62 is provided in the flange portion 51b, and the other end portion thereof opens a trailing edge of the flange portion 51b to the outside. The side end portion side cooling passage 63 is provided in the flange portion 51c, and the other end portion thereof opens a trailing edge of the flange portion 51c to the outside.

Figure 3:
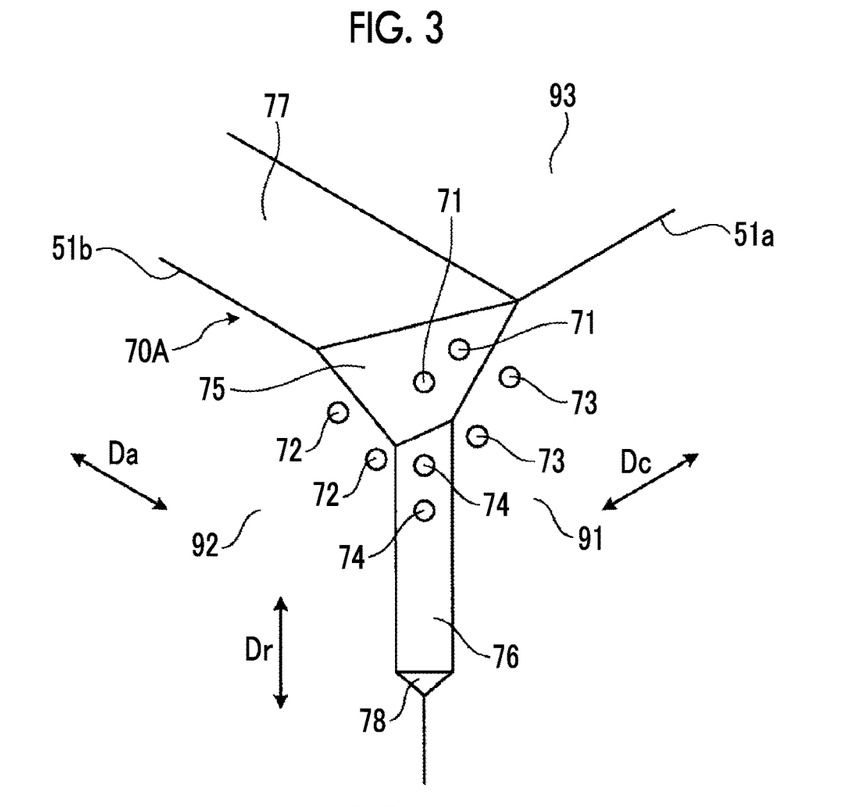
FIG. 3 is a perspective view illustrating a leading edge corner portion of an inner shroud.
Figure 4:
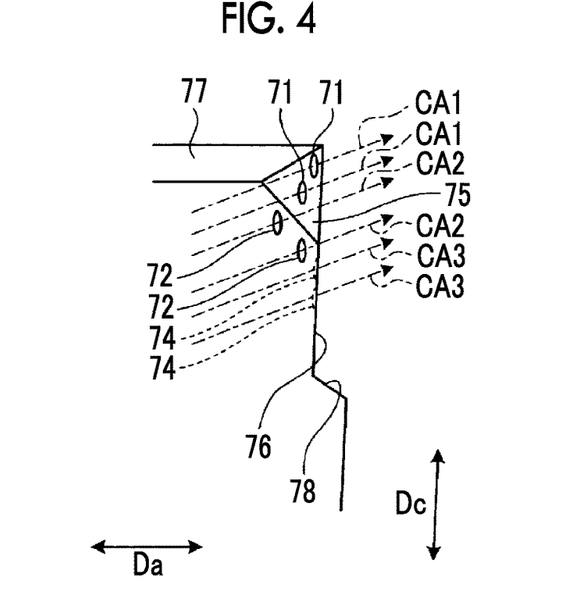
FIG. 4 is a side view illustrating the leading edge corner portion of the inner shroud.
Figure 5:
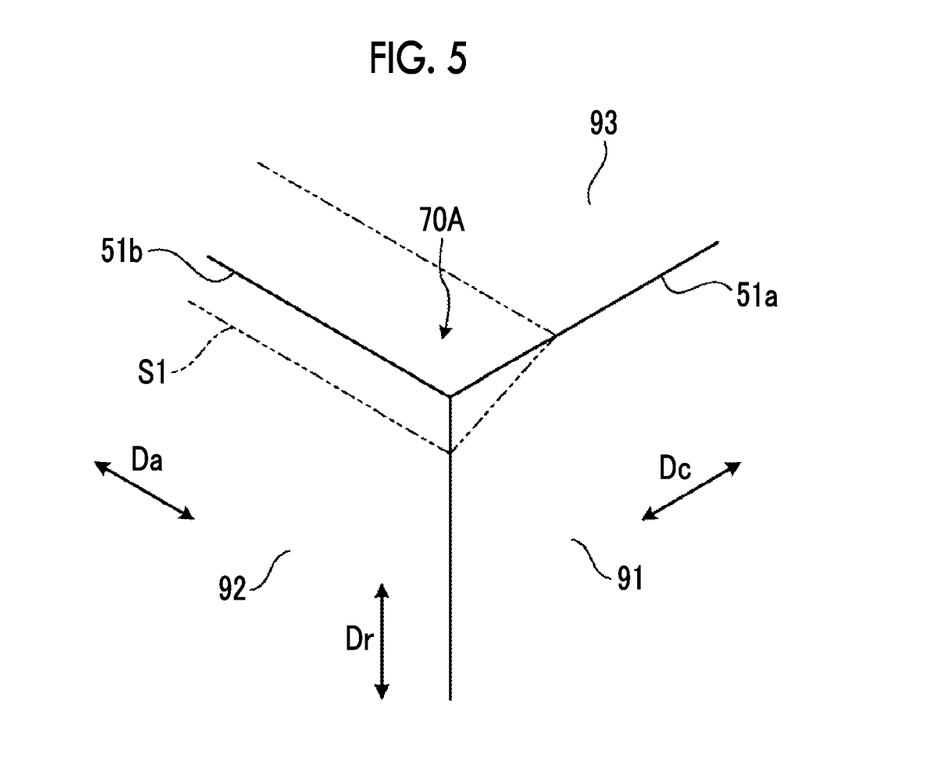
FIG. 5 is a perspective view illustrating a method of forming a first chamfered portion.
Figure 6:
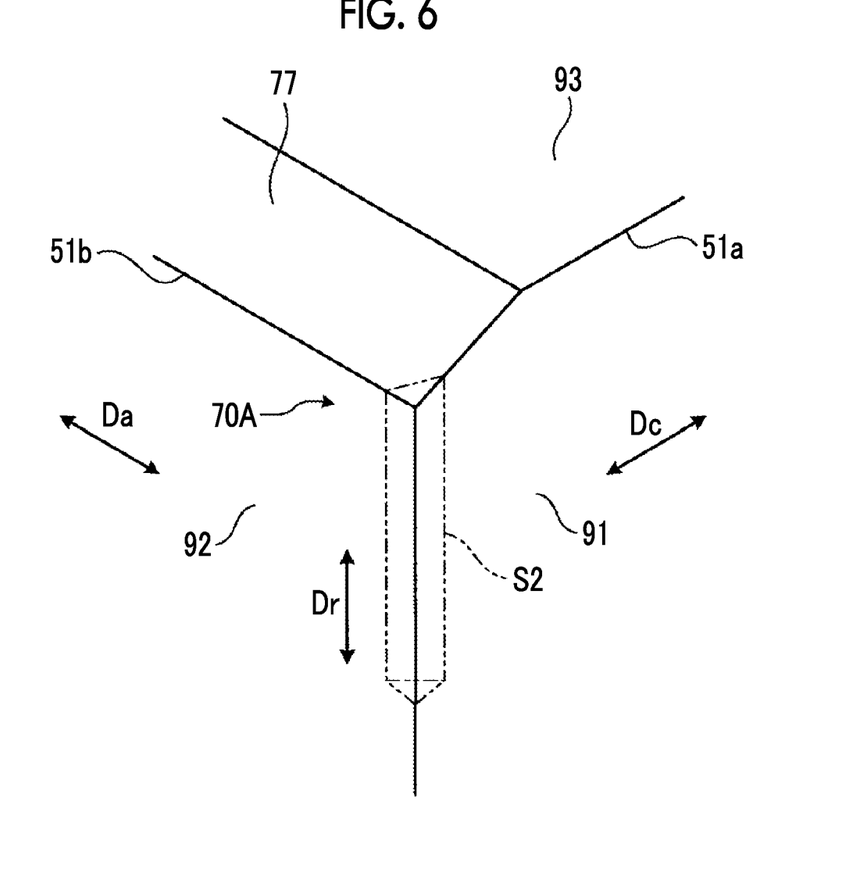
FIG. 6 is a perspective view illustrating a method of forming a second chamfered portion.
Figure 7:
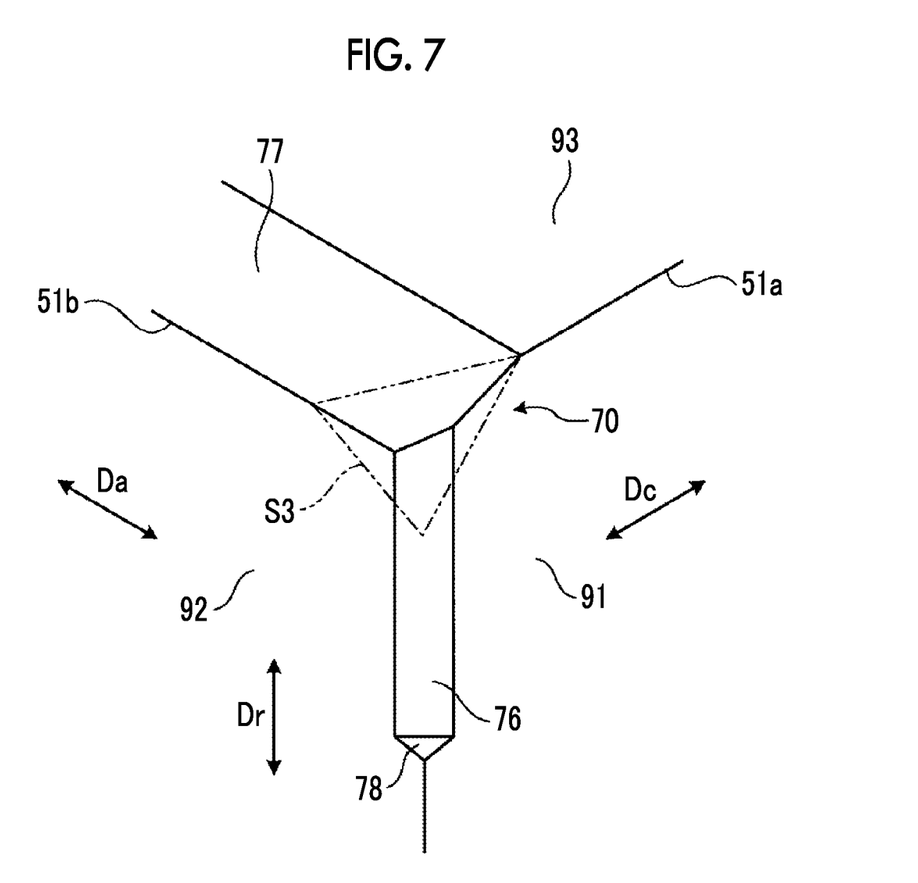
FIG. 7 is a perspective view illustrating a method of forming a third chamfered portion.

Additionally, the inner shroud 23 has two leading edge corner portions 70A and 80A provided on both sides in the width direction (circumferential direction Dc) on the leading edge side and has two trailing edge corner portions 70B and 80B provided on both sides in the width direction (circumferential direction Dc) on the trailing edge side. The leading edge corner portions 70A and 80B on both sides are provided with cooling holes 71, 72, 73, 74, 81, 82, 83, and 84 that open to the outside from the inner shroud cooling passage 60. Hereinafter, the cooling holes 71, 72, 73, 74, 81, 82, 83, and 84 will be described in detail. FIG. 3 is a perspective view illustrating a leading edge corner portion of the inner shroud, FIG. 4 is a side view illustrating the leading edge corner portion of the inner shroud, FIG. 5 is a perspective view illustrating a method of forming a first chamfered portion, FIG. 6 is a perspective view illustrating a method of forming a second chamfered portion, and FIG. 7 is a perspective view illustrating a method of forming a third chamfered portion. In addition, FIGS. 4 to 7 schematically illustrate the leading edge corner portion 70A in which the flange portion 51a and the flange portion 51b of the inner shroud 23 are linked to each other.

As illustrated in FIGS. 2 to 4, the leading edge corner portion 70A of the inner shroud 23 is provided with a first chamfered portion 75, a second chamfered portion 76, and a third chamfered portion 77. The first cooling hole 71 is provided so as to open the first chamfered portion 75 to the outside from the inner shroud cooling passage 60 to allow fluid communication. The second cooling holes 72 and 73 are provided so as to open the side surface 92 and the front surface 91 serving as the outer surfaces of the inner shroud 23 to the outside from the inner shroud cooling passage 60 to allow fluid communication. The third cooling hole 74 is provided so as to open the second chamfered portion 76 to the outside from the inner shroud cooling passage 60 to allow fluid communication.

That is, as illustrated in FIG. 5, the leading edge corner portion 70A of the inner shroud 23 is provided at a position where three outer surfaces including a front surface 91 constituted by the flange portion 51a, a side surface 92 constituted by the flange portion 51b, and an upper surface (gas pass surface) 93 constituted by the flange portions 51a and 51b intersect each other. As illustrated in FIGS. 5 and 6, in the leading edge corner portion 70A, the third chamfered portion 77 is formed in the axial direction Da of the flange portion 51b. The third chamfered portion 77 is formed by cutting out a region S1 of the upper surface 93 on the side surface 92 side at a predetermined inclination angle. Additionally, as illustrated in FIGS. 6 and 7, in the leading edge corner portion 70A, the second chamfered portion 76 is formed in the radial direction Dr. The second chamfered portion 76 is formed by cutting out an intersecting region S2 between the front surface 91 and the side surface 92 at a predetermined inclination angle, and a fourth chamfered portion 78 is formed by the second chamfered portion 76. Moreover, as illustrated in FIGS. 3 and 7, the leading edge corner portion 70A is formed with the first chamfered portion 75 intersecting the front surface 91, the side surface 92, and the upper surface 93. The first chamfered portion 75 is formed by cutting out an intersecting region S3 between the front surface 91, the side surface 92, the second chamfered portion 76, and the third chamfered portion 77 at a predetermined inclination angle.

Also, as illustrated in FIGS. 3 and 4, two first cooling holes 71 open to the first chamfered portion 75, two second cooling holes 72 open to the side surface 92, two second cooling holes 73 open to the front surface 91, and two third cooling holes 74 open to the second chamfered portion 76. Additionally, the inner shroud 23 has no cooling hole formed on the upper surface 93 to which the stationary blade body 22 (refer to FIG. 2) is linked.

In addition, the leading edge corner portion 70A is not limited to the above-described shape. That is, the chamfered portion is not limited to the first chamfered portion 75, the second chamfered portion 76, the third chamfered portion 77, and the fourth chamfered portion 78, and at a minimum only the first chamfered portion 75 may be provided. Additionally, the third chamfered portion 77 and the fourth chamfered portion 78 may be eliminated, and only the first chamfered portion 75 and the second chamfered portion 76 may be used, or the number of chamfered portions may be increased. For example, as in the third chamfered portion 77, the chamfered portion may be formed in the circumferential direction Dc of the flange portion 51a by cutting out the region of the leading edge corner portion 70A on the front surface 91 side of the upper surface 93 at a predetermined inclination angle. Although it is optimal for processing that each of the chamfered portions 75, 76, 77, and 78 has a flat surface, each chamfered portion may have a curved surface having an uneven shape.

Additionally, the number of cooling holes 71, 72, 73, and 74 opening to the first chamfered portion 75, the side surface 92, the front surface 91, and the second chamfered portion 76, respectively, is not limited to two. For example, one cooling hole may be provided at a central portion of the first chamfered portion 75, one cooling hole may be provided at each of the positions of the side surface 92 and the front surface 91 in the vicinity of the first chamfered portion 75, or one cooling hole may be provided at the position of the second chamfered portion 76 in the vicinity of the first chamfered portion 75. Additionally, three or more cooling holes 71, 72, 73, and 74 may be provided in the first chamfered portion 75, the side surface 92, the front surface 91, and the second chamfered portion 76.

The first cooling hole 71, the second cooling holes 72 and 73, and the third cooling hole 74 are parallel to each other and are provided toward the upper surface 93 side to which the end portion of the stationary blade body 22 is linked. That is, a cooling air CA1 that flows out from the inner shroud cooling passage 60 through the first cooling hole 71 to the outside, a cooling air CA2 that flows out from the inner shroud cooling passage 60 through the second cooling holes 72 and 73 to the outside, and a cooling air CA3 that flows out from the inner shroud cooling passage 60 through the third cooling hole 74 to the outside are parallel to each other. Additionally, the respective cooling airs CA1, CA2, and CA3 are caused to flow out at a predetermined upward angle with respect to the upper surface 93 of the inner shroud 23. That is, the respective cooling airs CA1, CA2, and CA3 are jetted from the inner shroud 23 toward the stationary blade body 22 side. In addition, the first cooling hole 71, the second cooling holes 72 and 73, and the third cooling hole 74 are not limited to have the parallel configuration, and, for example, may be arranged to be separated from each other or close to each other toward the tip portion, or may be randomly arranged.

Meanwhile, as illustrated in FIG. 2, although the inner shroud 23 is not illustrated, the leading edge corner portion 80A is also provided with a first chamfered portion, a second chamfered portion, and a third chamfered portion, similarly to the leading edge corner portion 70A. The first cooling hole 81 is provided so as to open the first chamfered portion to the outside from the inner shroud cooling passage 60. The second cooling holes 82 and 83 are provided so as to open an opposite side surface and the front surface 91 serving as the outer surface of the inner shroud 23 to the outside from the inner shroud cooling passage 60. The third cooling hole 84 is provided so as to open the second chamfered portion to the outside from the inner shroud cooling passage 60.

In addition, in the present embodiment, the cooling holes 71, 72, 73, 74, 81, 82, 83, and 84 are provided in both the leading edge corner portions 70A and 80A of the inner shroud 23 on both sides in the width direction (circumferential direction Dc). However, these cooling holes may be provided only in any one of the leading edge corner portions 70A and 80A.

Additionally, as illustrated in FIGS. 1 and 2, the outer shroud 24 has a rectangular shape approximated to a rhomboid shape, similar to the inner shroud 23. The other end portion of the stationary blade body 22 in the longitudinal direction is fixed to a front surface portion of the outer shroud 24. The outer shroud 24 is provided with an outer shroud cooling passage 100 that supplies the cooling air CA supplied from the outside to at least a portion therearound. Although not illustrated, the outer shroud cooling passage 100 has a leading edge side cooling passage, two side end portion side cooling passages, and a linking cooling passage.

Hereinafter, a flow of cooling air in the stationary blade 21 of the present embodiment will be described.

In the stationary blade 21, the cooling air CA, which has flowed into the inner surface of the outer shroud 24 from the outside, flows through the outer shroud cooling passage 100 to cool the outer shroud 24. The cooling air CA, which has cooled the outer shroud 24, is supplied from the outer shroud 24 to each of the cavities 46 and 47 of the stationary blade body 22 and impingement-cools the stationary blade body 22. A portion of the cooling air CA, which has cooled the stationary blade body 22, is jetted from each cooling hole of the stationary blade body 22 to the outside to convection-cool the stationary blade body 22, and the remaining cooling air CA flows into the inner shroud 23.

The cooling air CA, which has flowed into the inner shroud 23 from the stationary blade body 22, flows through the inner shroud cooling passage 60 to cool the inner shroud 23. That is, the cooling air CA of the first cavity 46 in the stationary blade body 22 flows into the linking cooling passage 64 through the communication hole 65 and is supplied from the linking cooling passage 64 to the leading edge side cooling passage 61. The cooling air CA supplied to the leading edge side cooling passage 61 flows to both sides in the width direction (circumferential direction Dc), is supplied to the left and right side end portion side cooling passages 62 and 63, and then is discharged to the outside from the trailing edge. That is, the cooling air CA flows through the leading edge side cooling passage 61 and the side end portion side cooling passages 62 and 63 to cool the periphery of the inner shroud 23.

At this time, a portion of the cooling air CA supplied to the leading edge side cooling passage 61 flows out through at the respective leading edge corner portions 70A and 80A and the respective cooling holes 71, 72, 73, 74, 81, 82, 83, and 84. For example, when the leading edge corner portion 70A is described, as illustrated in FIGS. 3 and 4, the cooling air CA of the leading edge side cooling passage 61 flows out as cooling air CA1 from the first chamfered portion 75 through the first cooling hole 71. Additionally, the cooling air CA of the leading edge side cooling passage 61 flows out as cooling air CA2 through the second cooling holes 72 and 73. Moreover, the cooling air CA of the leading edge side cooling passage 61 flows out as cooling air CA3 through the third cooling hole 74. For that reason, the leading edge corner portion 70A is cooled by the cooling airs CA1, CA2, and CA3. Additionally, as illustrated in FIG. 2, similarly, also in the leading edge corner portion 80A, the cooling air CA of the leading edge side cooling passage 61 flows out through the first cooling hole 81, flows out through the second cooling holes 82 and 83, and flows out through the third cooling hole 74. For that reason, the leading edge corner portion 80A is cooled by the cooling air CA.

In addition, in the above-described embodiment, the stationary blade 21 is configured by fixing the inner shroud 23 to one end portion of the stationary blade body 22 in the longitudinal direction and fixing the outer shroud 24 to the other end portion thereof in the longitudinal direction. However, the invention is not limited to this configuration.

Figure 8:
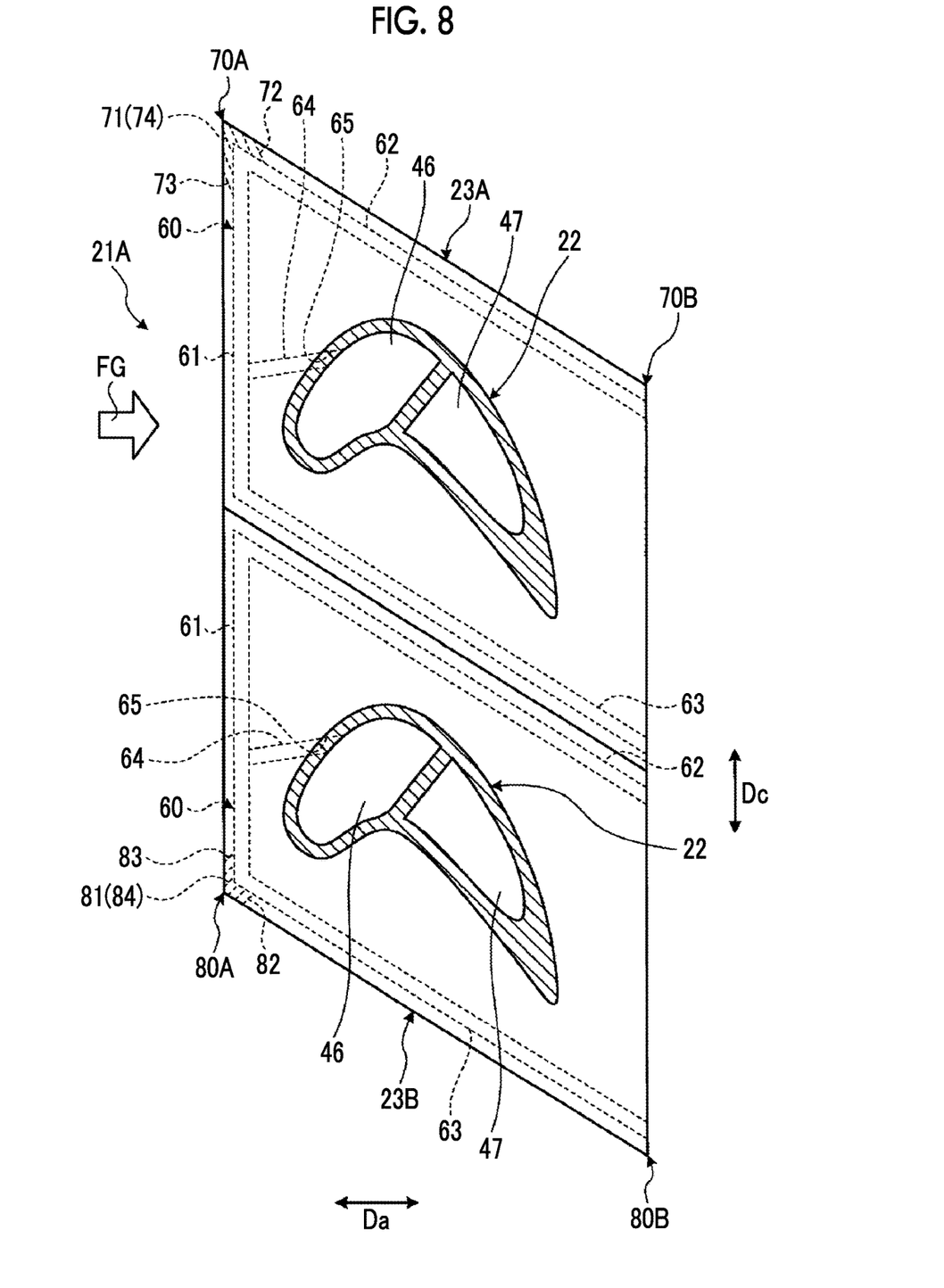
FIG. 8 is a cross-sectional view of an inner shroud illustrating a modification example of the stationary blade of the present embodiment.

FIG. 8 is a cross-sectional view of an inner shroud illustrating a modification example of the stationary blade of the present embodiment.

As illustrated in FIG. 8, the stationary blade 21A is a blade combination, which is called a segment stationary blade, that is configured such that two inner shrouds 23A and 23B (almost the same as the above-described inner shroud 23) are annularly combined together and two outer shrouds (not illustrated) are annularly combined together. In addition, the stationary blade body 22 and the outer shroud have the same configuration as that of the above-described embodiment. The inner shrouds 23A and 23B or the outer shrouds are bolted together, for example.

Each of the inner shrouds 23A and 23B is provided with the inner shroud cooling passage 60 that supplies the cooling air CA supplied through the stationary blade body 22 to the surroundings. The inner shroud cooling passage 60 has the leading edge side cooling passage 61, the side end portion side cooling passages 62 and 63, and the linking cooling passage 64. The inner shroud 23A has the cooling holes 71, 72, 73, and 74, which open to the outside from the inner shroud cooling passage 60, provided at the leading edge corner portion 70A on one side in the width direction (circumferential direction Dc). Meanwhile, the inner shroud 23B has the cooling holes 81, 82, 83, and 84, which open to the outside from the inner shroud cooling passage 60, provided at the leading edge corner portion 80A on the other side in the width direction (circumferential direction Dc). In addition, no cooling holes are provided at a leading edge corner portion on the other side in the width direction (circumferential direction Dc) of the inner shroud 23A and a leading edge corner portion on one side in the width direction (circumferential direction Dc) of the inner shroud 23B.

In addition, since the flow of cooling air in the stationary blade 21A is almost the same as that of the stationary blade 21, the description thereof will be omitted.

In this way, the blade of the present embodiment includes the stationary blade body 22 having the cavities 46 and 47 therein and the inner shroud 23 linked to the end portion of the stationary blade body 22 in the longitudinal direction and having the inner shroud cooling passage 60 with which the first cavity 46 is in fluid communication provided therein, and the inner shroud 23 has the first chamfered portion 75 intersecting the front surface 91, the side surface 92, and the upper surface 93 provided at the leading edge corner portion 70A (80A) and has the first cooling hole 71 (81) in fluid communication with the inner shroud cooling passage 60 provided at the first chamfered portion 75.

Therefore, since the cooling air CA supplied to the inner shroud cooling passage 60 of the inner shroud 23 flows out from the first chamfered portion 75 through the first cooling hole 71, the first chamfered portion 75 of the leading edge corner portion 70A in the inner shroud 23 is appropriately cooled by the cooling air CA. In the related art, cooling holes have been provided on the outer surface and side edges of the inner shroud. However, in such a configuration, the cooling of acute-angled corner portions themselves of the inner shroud becomes insufficient. In the present embodiment, since the first chamfered portion 75 provided in the leading edge corner portion 70A (80A) is cooled by the first cooling hole 71, a high temperature region in the inner shroud 23 is efficiently cooled, and the cooling performance can be improved.

In the stationary blade of the present embodiment, the first cooling hole 71 (81) is provided to be inclined toward the upper surface (gas pass surface) 93 side of the inner shroud 23 to which the end portion of the stationary blade body 22 is linked. Therefore, since the first cooling hole 71 allows the cooling air CA of the inner shroud cooling passage 60 to flow out toward the upper surface 93 side of the inner shroud 23 to which the end portion of the stationary blade body 22 is linked, the upper surface 93 side of the leading edge corner portion 70A in the inner shroud 23 can be efficiently cooled.

In the stationary blade of the present embodiment, the second cooling holes 72 and 73 (82 and 83) are provided to open the front surface 91 and the side surface 92 to the outside from the inner shroud cooling passage 60. Therefore, the cooling air CA of the inner shroud cooling passage 60 flows out from the first chamfered portion 75 through the first cooling hole 71 and flows out from the front surface 91 and the side surface 92 through the second cooling holes 72 and 73. As a result, the leading edge corner portion 70A of the inner shroud 23 can be efficiently cooled.

In the stationary blade of the present embodiment, the first cooling holes 71 (81) and the second cooling holes 72 and 73 (82 and 83) are provided parallel to each other. Therefore, the first cooling hole 71 and the second cooling holes 72 and 73 can be formed at the same time by one drilling using a plurality of drilling tools, and the machining cost can be reduced by improving the workability.

In the stationary blade of the present embodiment, the second chamfered portion 76 that intersects the front surface 91 and the side surface 92 is provided, and the third cooling hole 74 (84) that opens the second chamfered portion 76 to the outside from the inner shroud cooling passage 60 is provided. Therefore, the cooling air CA of the inner shroud cooling passage 60 flows out from the first chamfered portion 75 through the first cooling hole 71 and flows out from the second chamfered portion 76 through the third cooling hole 74. As a result, the leading edge corner portion 70A of the inner shroud 23 can be efficiently cooled.

In the stationary blade of the present embodiment, the second chamfered portion 76 is provided to be separated from the upper surface (gas pass surface) 93 side of the inner shroud 23 to which the end portion of the stationary blade body 22 is linked. Therefore, the cooling air CA of the inner shroud cooling passage 60 is separated from the upper surface 93 side of the inner shroud 23 to which the end portion of the stationary blade body 22 is linked and flows out from the second chamfered portion 76 through the third cooling hole 74. As a result, the cooling air CA does not adversely affect the flow of the combustion gas FG passing through the stationary blade body 22.

In the stationary blade of the present embodiment, as the inner shroud cooling passage 60, the leading edge side cooling passage 61, the side end portion side cooling passages 62 and 63 of which one end portion communicates with the leading edge side cooling passage 61 and the other end portion opens to the outside, and the linking cooling passage 64 linking the cavity 46 and the leading edge side cooling passage 61 together are provided. Therefore, the cooling air CA supplied to the cavity 46 of the stationary blade body 22 flows from the linking cooling passage 64 through the leading edge side cooling passage 61 to the side end portion side cooling passages 62 and 63, flows to the outside, and flows out from the first chamfered portion 75 through the first cooling hole 71. As a result, the inner shroud 23 can be efficiently cooled.

In the stationary blade of the present embodiment, the inner shroud 23 has a rectangular shape, and the first cooling holes 71 and 81 are provided in at least one of the two leading edge corner portions 70A and 80A. Therefore, only the high temperature region of the inner shroud 23 can be efficiently cooled.

In the stationary blade of the present embodiment, the two inner shrouds 23A and 23B are annularly combined together to constitute the blade combination, the cooling holes 71, 72, 73, and 74 are provided in the leading edge corner portion 70A of one inner shroud 23A, and the cooling holes 81, 82, 83, and 84 are provided in the leading edge corner portion 80A of the other inner shroud 23B. Therefore, even in the blade combination in which the two inner shrouds 23A and 23B are combined together, the cooling holes 71, 72, 73, 74, 81, 82, 83, and 84 are provided in the leading edge corner portions 70A and 80A on both sides in the width direction. Therefore, only the high temperature region of the blade combination can be efficiently cooled.

Additionally, the gas turbine of the present embodiment includes the compressor 11 that compresses the air AI, the combustor 12 that mixes and combusts the compressed air AI compressed by the compressor 11 with the fuel FL, and the turbine 13 that has the stationary blade 21 and obtains rotational power from the combustion gas FG generated by the combustor 12.

Therefore, in the stationary blade of the turbine 13, the cooling air CA supplied to the inner shroud cooling passage 60 of the inner shroud 23 flows out from the first chamfered portion 75 through the first cooling hole 71, and the cooling air CA appropriately cools the first chamfered portion 75 of the leading edge corner portion 70A of the inner shroud 23. For that reason, the high temperature region in the inner shroud 23 can be efficiently cooled, and the cooling performance can be improved.

In addition, in the above-described embodiment, a description has been made by applying the supporting member in the blade of the present invention to the inner shroud 23 of the stationary blade 21 of the turbine 13. However, the supporting member may be applied to the outer shroud 24. Additionally, although a description has been made by applying the blade of the present invention to the stationary blade 21 of the turbine 13, the blade may be applied to the rotor blade 25. In this case, the blade supporting member is the platform 27. Additionally, the blade of the present invention may be applied to the blade of another rotary machine.

REFERENCE SIGNS LIST

10: gas turbine
11: compressor
12: combustor
13: turbine
14: rotor
15: generator
21, 21A: stationary blade (blade)
22: stationary blade body (blade body)
23: inner shroud (blade supporting member)
24: outer shroud (blade supporting member)
25: rotor blade
31: support ring
32: combustion gas flow path
41: front end portion
42: rear end portion
43: back portion
44: abdominal portion
45: partition wall
46: first cavity (cooling passage)
47: second cavity (cooling passage)

51: frame
51a, 51b, 51c, 51d: flange portion
52: attachment portion
60: inner shroud cooling passage (space portion)
61: leading edge side cooling passage
62, 63: side end portion side cooling passage
64: linking cooling passage
65: communication hole
70A, 80A: leading edge corner portion
71, 81: first cooling hole
72, 73, 82, 83: second cooling hole
74, 84: third cooling hole
75: first chamfered portion
76: second chamfered portion
77: third chamfered portion
78: fourth chamfered portion
91: front surface (outer surface)
92: side surface (outer surface)
93: upper surface (outer surface, gas pass surface)
100: outer shroud cooling passage
AI: air
AC: compressed air
CA: cooling air
FL: fuel
FG: combustion gas
EG: exhaust gas
S1, S2, S3: region

The invention claimed is:

1. A blade comprising:
a blade body having a cooling passage defined therein; and
a blade supporting member linked to an end portion of the blade body in a longitudinal direction and having a space portion defined therein which is in fluid communication with the cooling passage,
wherein:
the blade supporting member has two leading edge corner portions on a leading edge side and two trailing edge corner portions on a trailing edge side, at least one of the two leading edge corner portions includes a first chamfered portion intersecting three or more outer surfaces, and the first chamfered portion includes a first cooling hole in fluid communication with the space portion and an outside of the blade body;
the first cooling hole is inclined toward an upstream side of a gas path surface side of the blade supporting member to which the end portion of the blade body is linked;
a second chamfered portion intersects two outer surfaces of the three or more outer surfaces, and a second cooling hole, which connects the space portion and the outside of the blade body, is defined in the second chamfered portion; and
the second chamfered portion is connected to the first chamfered portion such that the second chamfered portion is further from a gas path surface of the blade supporting member than the first chamfered portion.

2. The blade according to claim 1,
wherein a third cooling hole, which connects the space portion and the outside of the blade body, is defined in each of the two outer surfaces of the three or more outer surfaces.

3. The blade according to claim 2,
wherein the first cooling hole and the third cooling hole are parallel to each other.

4. The blade according to claim 1,
wherein the second chamfered portion is separated from the gas path surface side of the blade supporting member to which the end portion of the blade body is linked.

5. The blade according to claim 1,
wherein the space portion includes a leading edge side cooling passage, a side end portion side cooling passage including a first end portion which communicates with the leading edge side cooling passage and a second end portion which opens to the outside of the blade body, and a linking cooling passage that links the cooling passage of the blade body to the leading edge side cooling passage.

6. The blade according to claim 1,
wherein the blade supporting member has a rectangular shape.

7. The blade according to claim 1,
wherein the blade supporting member is one of a plurality of blade supporting members annularly combined together to define a blade combination, and the first cooling hole is defined at a leading edge corner portion of the blade combination.

8. A gas turbine comprising:
a compressor configured to compress air;
a combustor configured to: (i) mix the air compressed by the compressor with fuel to obtain mixed fuel; and (ii) combust the mixed fuel; and
a turbine configured to obtain rotational power from a combustion gas generated by the combustor,
wherein the turbine includes the blade according to claim 1.

* * * * *